United States Patent [19]

Ryckman et al.

[11] Patent Number: 4,684,788
[45] Date of Patent: Aug. 4, 1987

[54] ELECTRIC TOASTER OVEN CONTROL

[75] Inventors: William D. Ryckman, Orange; Walter H. Gordon, Huntington, both of Conn.

[73] Assignee: Black & Decker, Inc., Newark, Del.

[21] Appl. No.: 764,761

[22] Filed: Aug. 12, 1985

[51] Int. Cl.$^4$ ............................ F24C 7/08; A47J 37/08
[52] U.S. Cl. .................................... 219/413; 219/412; 219/386
[58] Field of Search ............... 219/413, 412, 411, 405, 219/385, 386, 408, 521, 391; 126/275 E

[56] References Cited

U.S. PATENT DOCUMENTS

| | | | |
|---|---|---|---|
| 4,302,660 | 11/1981 | Swanson | 219/413 |
| 4,456,820 | 6/1984 | Krasznai et al. | 219/398 |
| 4,517,452 | 5/1985 | Krasznai et al. | 219/413 |

FOREIGN PATENT DOCUMENTS 1201419  8/1970  United Kingdom ................ 219/413

Primary Examiner—E. A. Goldberg
Assistant Examiner—Teresa J. Walberg
Attorney, Agent, or Firm—Paul J. Lerner

[57] ABSTRACT

An electric toaster oven construction wherein a unique rotatable cam, cam follower and control panel construction accurately sets the threshold temperature of a thermostat switch. The rotatable cam is loosely mounted in the control panel and the cam follower urges the cam against a projection on the control panel to thereby sense the thickness of the cam between the projection on the control panel and the cam follower. With this construction, the height of the cam is accurately sensed although the cam may be warped or out of perpendicular with its shaft.

5 Claims, 9 Drawing Figures

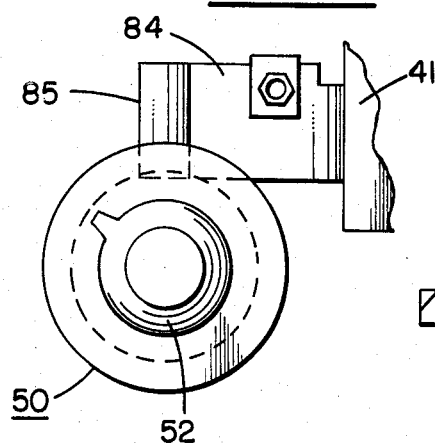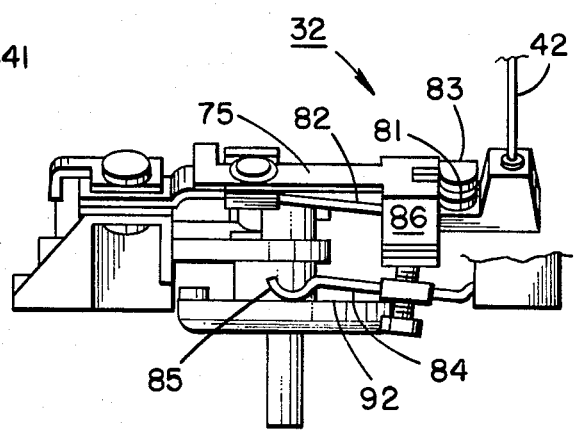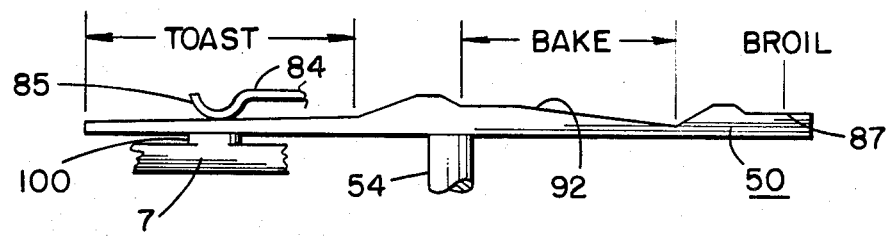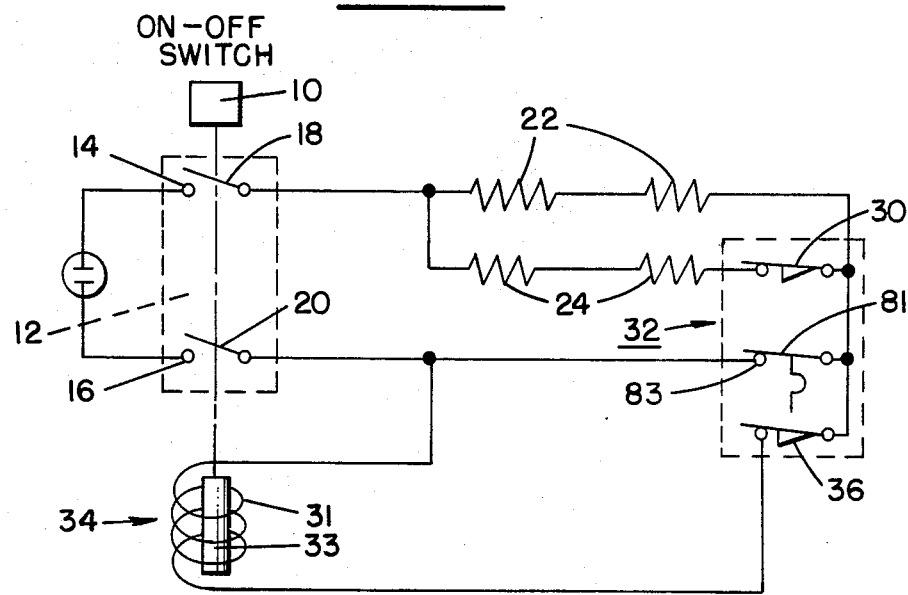

4,684,788

ELECTRIC TOASTER OVEN CONTROL

BACKGROUND OF THE INVENTION

1. Field of the Invention

This invention relates to an electric oven toaster and, more particularly, to an improved accurate cam control mechanism for such an oven toaster.

2. Description of the Prior Art

In a prior U.S. Pat. No. 4,456,820 to Charles Z. Krasznai and Paul V. Snyder, assigned to the same assignee as the present invention, there is disclosed a rotatable cam control mechanism for an oven toaster. As shown, a rotatable cam 50 is provided for setting the threshold temperature of a thermostat switch 32, 81 and 83 for baking, toasting and broiling operations. An annular or circular disc portion 92 of the cam extends rearwardly and is in sliding engagement with a thermostat cam follower 84 so that the rotary position of the cam 50 may be manually adjusted to set the disc portion 92 of the cam to set the thermostat cam follower 84 for a particular toast color. The disc portion 92 of the cam also includes a sloping cam surface for setting bake temperatures from 200° to 500° during a baking operation. In addition, the disc portion 92 of the cam includes a rearwardly extending surface for setting a threshold temperature for the thermostat switch 32 during a broiling operation. Thus, the rotary disc portion 92 of the cam operates on the cam follower 84 to set the position of the thermostat switch contact 83 during a toasting, broiling, or baking operation.

Our invention is concerned with such a toaster oven control, and more particularly to a unique simplified construction for improving the accuracy of sensing and transmitting the height of the various cam surfaces to the cam follower and the thermostat switch contact 83.

SUMMARY OF THE INVENTION

Accordingly, it is a particular object of our invention to provide an improved cam and cam follower construction which more reliably and accurately senses and transmits the various cam heights to the cam follower and the thermostat switch.

It is a further object of our invention to provide a construction which accurately senses the height of the cam surfaces although the cam may be warped, the front surface of the cam may not be as flat as desired and although the rotatable cam shaft may not be held with close tolerances in a control panel bearing.

As in the afore-mentioned patent, an electric oven toaster which may be operated by our new improved cam and cam follower construction may include heating elements and a thermostat switch which may be set to open when a particular pre-set temperature has been reached. The toaster oven also includes a manually operable rotatable cam for setting the threshold temperature of the thermostat switch and a cam follower spring blade that is positioned between the manually operable rotatable cam and a movable switch blade of the thermostat.

In accordance with our invention, in order to sense the height of the rear cam surfaces although the cam may be warped and the front surface may not be as flat as desired, we purposely support the shaft of the rotatable cam in a circular aperture in the control panel with a very loose fit to allow the flat front surface of the cam and hence the rear surfaces of the cam to move toward and away from the control panel and to a slight amount in a sidewise direction as the cam is rotated to set a desired temperature. A uniquely positioned projection is integrally formed with the control panel for continuous slidable engagement with the front surface of the rotatable cam. The projection is positioned directly opposite to the cam contacting slide portion of the spring urged cam follower to allow the cam follower to continuously urge the rotatable cam into contact with the projection on the control panel. In this manner, the cam follower will always accurately sense the thickness of the portion of the rotatable cam with which it is in contact, the thickness being the distance from the projection on the control panel to the cam contacting slide portion of the spring cam follower.

It can be appreciated that with the loose fit between the cam shaft and the circular aperture in the control panel, when the spring urged cam follower forces the cam surface of the cam forwardly such motion will not be impeded by any close fit of the cam shaft with respect to the circular aperture in the control panel.

With this unique construction, it can be seen that the cam and cam follower may be manufactured at low cost and the reliability and accuracy of the control is enhanced. With the loose fit between the cam control shaft and the aperture in the control panel, very wide manufacturing tolerances may be specified so that few if any parts that are manufactured will not meet the wide manufacturing specifications that may be set. Even cams that are slightly warped or which have a front surface that is not completely flat may be just as effectively utilized as perfectly manufactured cams. This is achieved because with our improved construction the cam will always be held in close contact with the projection that is formed on the control panel. The construction senses only the thickness of the cam between the cam follower and the front surface of the cam directly below the cam follower. Accordingly, variations due to warped or out of flat cams is minimized and a more accurate adjustment of the position of the switch thermostat has been achieved.

BRIEF DESCRIPTION OF THE DRAWING

Other objects and attendant advantages of the invention will be apparent from the following description taken in connection with the accompanying drawing in which:

FIG. 5 is a fragmentary front elevational view of our improved control mechanism showing the rotatable disc cam portion of the cam in engagement with the thermostat switch blade cam follower;

FIG. 6 is a fragmentary top view of our improved control mechanism;

FIG. 7 is a diagrammatic view of the disc portion of the rotary cam and the thermostat cam follower showing the disc cam surfaces that are normally disposed in a circle on the disc cam, unrolled to show the relative cam levels;

FIG. 8 is a circuit diagram and partial schematic view of portions of the control mechanism for the electric oven toaster illustrated in FIGS. 1-7.

DESCRIPTION OF THE PREFERRED EMBODIMENT

Figure 1:
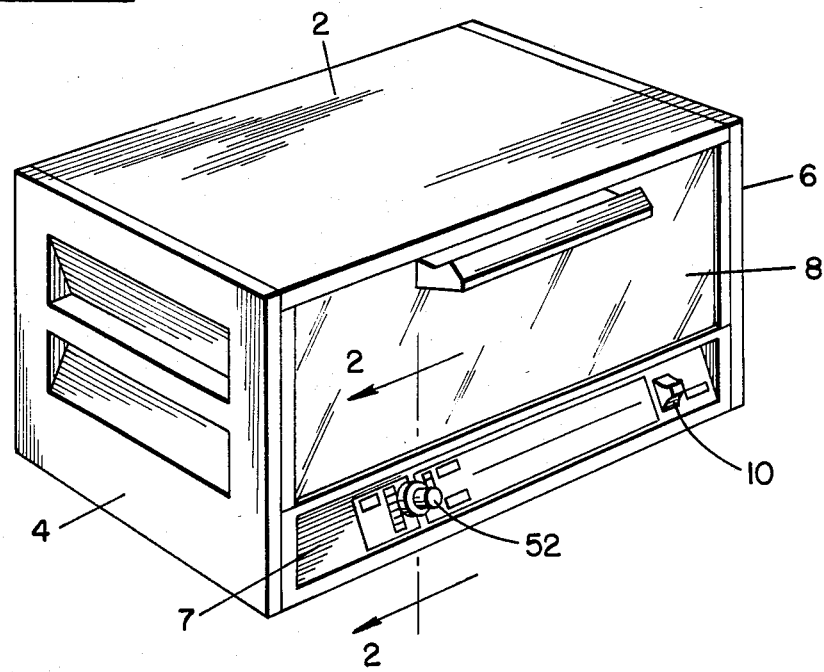
FIG. 1 is a perspective view of an electric oven toaster broiler embodying our improved control mechanism.

Referring now to the drawing and first particularly to FIG. 1, there is shown an electric oven toaster which includes a toasting oven and broiling chamber in which is mounted a generally horizontal rack for holding food to be baked or broiled, or bread to be toasted. The oven toaster includes a generally horizontal top wall 2, generally parallel vertical side walls 4 and 6 and a front wall 8 including a control panel 7 on which the controls for the oven toaster are mounted.

With particular reference to FIGS. 1 and 8, a manually operable ON-OFF switch button 10 is located at the right side of the oven toaster for manually actuating a double pole main switch 12 that includes two fixed contacts 14 and 16 and two movable contacts 18 and 20, respectively. Upper heating elements 22 are connected in a parallel circuit relationship with lower heating elements 24 as shown in FIG. 8.

During a broiling operation, only the upper heating elements 22 should be energized and, accordingly, a broil switch 30 is provided for opening the circuit to the lower heating elements. A thermostat switch 32 including switch contacts 81 and 83 is provided for cycling the upper and lower heating elements ON and OFF to maintain the desired baking temperature during a bake operation, for interrupting power to the upper and lower heating elements at the termination of a toasting cycle when a particular toast temperature or toast color is achieved and for termininating a broiling operation when an overtemperature condition is sensed.

As shown in FIGS. 1 and 8, the main switch may be manually opened or closed by simply raising or lowering switch knob 10. The main switch 12 may also be operated to its open position by energizing the solenoid 34 at the end of a toasting cycle or upon the attainment of an overtemperature condition during a broiling cycle.

A bake switch 36 is provided for opening the circuit to the solenoid to prevent the solenoid from operating during a baking operation. Thus, during a baking operation, the thermostat switch 32 may open and close to cycle the upper and lower heating elements ON and OFF without actuating the solenoid. However, during a toasting operation with the bake switch 36 closed, the thermostat switch 32 upon reaching its threshold toast color or toast temperature will open the thermostat switch to thereby energize the solenoid 34 through the closed bake switch 36 to open the main switch.

Figure 3:
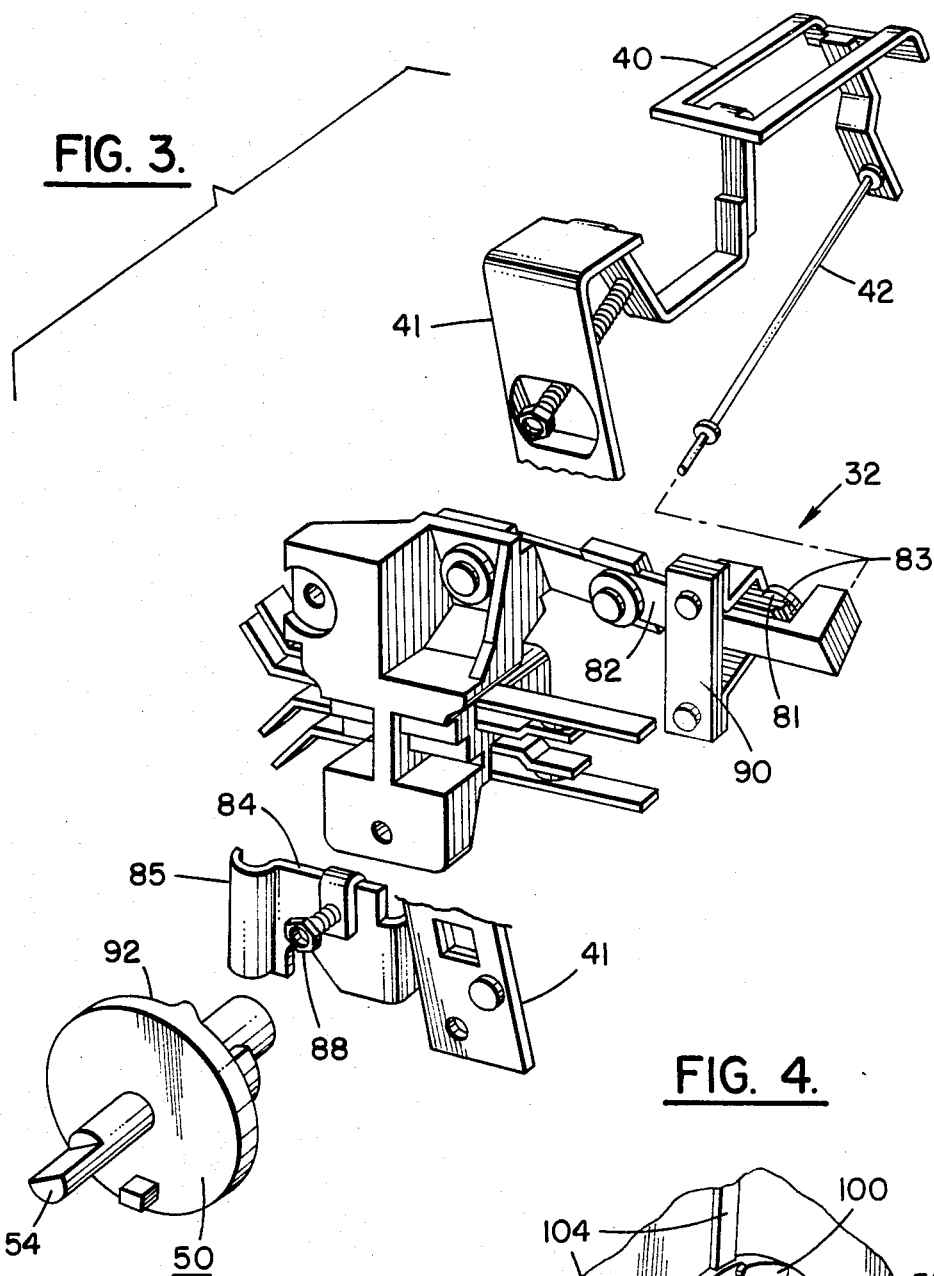
FIG. 3 is a fragmentary exploded perspective view showing our improved control mechanism.

As shown more particularly in FIG. 3, a temperature sensitive bi-metal 40 is mounted on a bracket 41 and is positioned within the oven toaster in spaced relation between upper heating elements 22 and lower heating elements 24 for sensing the color of the toast to be toasted and the temperature within the cooking chamber. As the bi-metal 40 increases in temperature, it flexes generally downwardly thus causing a switch actuator rod 42 to move generally horizontally forwardly to move contact 81 forwardly to open the thermostat switch 32.

A rotatable cam 50 is provided for opening or closing the switches to perform a toasting operation, a broiling operation, or a baking operation, and the cam is also constructed to simultaneously set the desired threshold temperature of the thermostat switch 32, 81 and 83 for the particular operation that has been selected. As shown more particularly in FIGS. 1 and 2, the cam 50 may be operated by means of a knob 52 that is fixed to its shaft 54.

The thermostat switch 32, 81 and 83 is provided for cycling the heating elements ON and OFF to maintain the desired temperature during the ovening operation, terminating the toasting operation upon the achievement of a threshold temperature and also terminating a broiling operation on sensing an overtemperature condition.

As shown more particularly in FIGS. 3 and 6, the thermostat switch 32 includes a lower forward contact 81 which is fixed to a blade 82 that may be moved forwardly by rod 42 upon an increase in temperature and an upper rearward settable contact 83. The temperature setting of the thermostat switch 32 is adjusted or set by means of a cam follower blade 84. A fine adjusting screw 88 is connected to the cam follower blade 84 for cooperating with a switch block 90 formed of insulating material to adjust the position of switch blade 75 and the switch contact 83. As shown, contact 83 is fixed to the blade 75 and the insulating block 90 is connected to the blade 75 by means of forwardly extending arms 86 that may be integrally formed with blade 75.

As shown more particularly in FIG. 3, a rotatable cam 50 is formed to include an annular portion 92 for cooperating with the thermostat switch cam follower 84.

Figure 2:
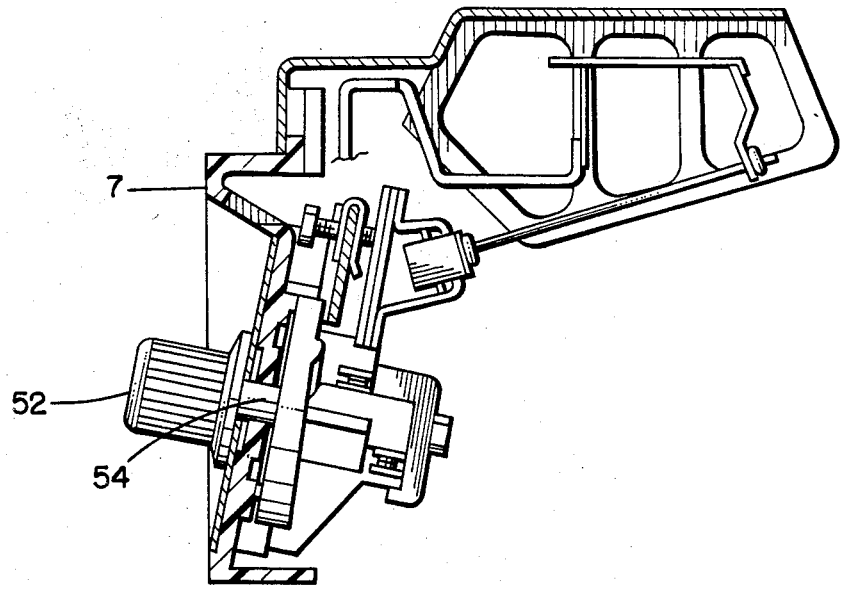
FIG. 2 is a fragmentary side elevational view of a portion of our electric control mechanism.

As shown more particularly in FIGS. 2, 6 and the unrolled or expanded view of FIG. 7, the annular portion 92 of the cam has a rearwardly facing cam surface for cooperating with the thermostat cam follower 85 to set the desired position of blade 84 to set the desired threshold temperature of the thermostat switch 32.

It can be appreciated that, when the rotatable knob 52 is turned to the toast position the thermostat cam follower 85 will reside at a particular location on the slope of the toast cam portion of the disc cam 92 to select the desired degree of toast color from 1-9.

When the cam 50 is rotated to the bake position the thermostat cam follower will be moved to the bake temperature surface shown in FIG. 7 to select an appropriate bake temperature between 200° and 500°.

When the cam 50 is rotated to the broil position as shown in FIG. 7, the thermostat cam follower 84 will be on the flat 87 of the broil cam position of cam 92.

The details of the circuit, main switch, solenoid, and bi-metal temperature sensor 40 do not form a part of this invention and are described and illustrated in greater detail in generally similar constructions shown in a prior U.S. Pat. No. 3,752,955 to Lawrence L. Grove assigned to the same assignee as the present invention, and the general use of a rotatable cam 50 and a cam follower 84,85 for setting a thermostat switch 32, 81 and 83 is shown and described in the aforementioned U.S. Pat. No. 4,456,820 to Krasznai and Snyder and a U.S. Pat. No. 4,517,452 to Norwood and Snyder both assigned to the same assignee as the present invention.

Figure 4:
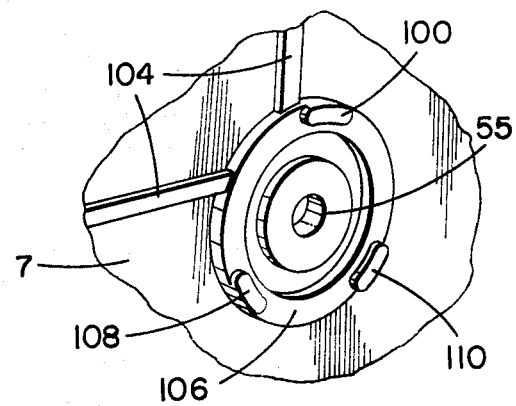
FIG. 4 is a fragmentary rear perspective view of the inside of the control panel and particularly our unique projection on which the front surface of the rotatable disc cam slides as it is rotated and urged forwardly by the cam follower.

In accordance with our invention in order to sense the height of the rear cam surfaces although the particular cam may have been manufactured with wide manufacturing tolerances and may be slightly warped with a front surface that may not be as flat as desired, we have provided a readily manufacturable projection 100 on the rear surface of a control panel and have loosely supported the rotatable shaft portion 54 of the cam in the control panel. As shown more particularly in FIG. 4 and the enlarged fragmentary diagrammatic side elevational view of FIG. 9 wherein the parts are shown in slightly exaggerated positions, the unique projection 100 is formed on the inside or rear surface of the control panel 7 which is provided for supporting the various components of the toaster oven controls.

Figure 9:
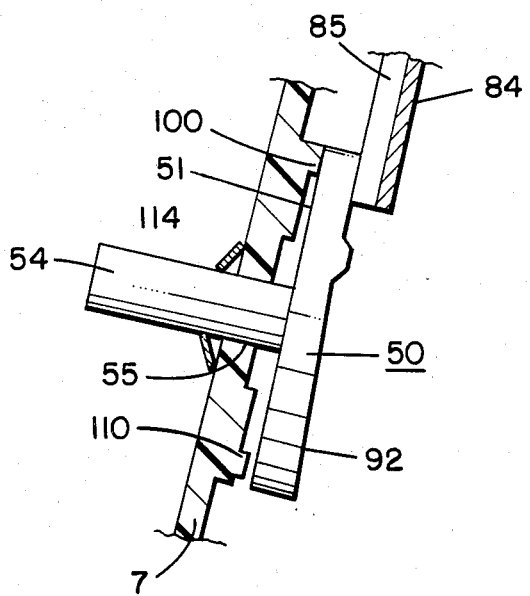
FIG. 9 is an enlarged fragmentary diagrammatic side elevational view similar to FIG. 2 with the parts shown in slightly exaggerated positions for purposes of illustration.

With particular reference to FIGS. 2 and 9, it can be seen that the rotatable cam 50 includes a shaft portion 54 which is supported in a circular bearing aperture 55 that is provided in the control panel wall 7. The cam includes a front circular disc surface 51 which is arranged generally perpendicular to the axis of the shaft portion 54 and a rear surface 92 which is shaped to form the various cam surfaces.

The rotatable cam 50 including its shaft 54, front surface 51, and rear cam surface 92 is preferably formed from plastic in a plastic molding machine manufacturing operation. With such a manufacturing operation the thickness of the cam disc 50 can be readily controlled and strict manufacturing thickness tolerances may be achieved; however, other portions of the overall cam are not as easily controlled to provide complete uniformity in all areas. For example, with a warm plastic cam that has recently been ejected from a molding machine, it can be appreciated that the shaft portion may be pushed with respect to the disc portion so that the front surface of the cam is not exactly perpendicular to the shaft portion of the cam. In like manner, after a hot cam has been ejected from the molding machine pressure may be exerted on any particular area of the disc to warp the cam and move that area of the cam disc out of line with respect to the other portions of the cam disc. When hot cams are ejected from a molding machine into a hopper it can be appreciated that the simple weight of the adjacent cams could easily warp the cams or move the shaft portions out of perpendicular with respect to the disc portions although such movement would have little or no effect on the thickness of the cam at a particular circumferential position.

With particular reference to FIGS. 2 and 9, it can be appreciated that with such a warped cam and the shaft portion 54 of the cam closely held in circular bearing aperture 55 in a control panel 7, as the cam is rotated the cam follower 84 would measure or sense not only the rear surface 92 of the cam but also the particular warpage of the cam and the amount that the disc portion of the cam is out of perpendicular with respect to the shaft portion of the cam.

In accordance with our invention the circular aperture 55 in the control panel 7 is sized to loosely receive the shaft portion 54 of the cam to allow the cam disc to move toward and away from the control panel 7 and to a slight amount in a sidewise direction as the cam is rotated to set a desired temperature. As shown more particularly in FIG. 4, the control panel 7 is also preferably molded from plastic material and includes the circular aperture 55 for loosely receiving the shaft portion 54 of the cam, integrally molded supporting ribs 104 and a circular annular projection 106 about the same size as the disc cam 50. During manufacture the shaft portion 54 of inserted through the aperture 55 through the rear surface of the control panel 7 and as shown in FIG. 9, a conventional washer 114 with inwardly directed spring fingers is pushed over the front portion of the cam shaft 54 and the shaft 54 is pulled forwardly until the front face of the cam 50 abuts the three guiding projections 100,108 and 110. Thus, the cam 50 is held in loosely assembled position on the control panel 7 and the cam may be manually rotated by knob 52 while it is guided by the sliding contact of its front face on projections 100,108 and 110.

While the three rearwardly extending projections 100, 108 and 110 are utilized to guide the cam 50, the upper projection 100 is uniquely shaped and positioned with respect to the rotatable cam 50 and the cam follower 84 in accordance with our invention to continuously slide on the front surface 51 of the cam 50. As shown in FIG. 7, the rearwardly extending projection 100 is specifically located on the control panel 7 to be directly opposite to the cam contacting slide portion 85 of the spring urged cam follower 84. The projection 100 is of such a circumferential width so that it is wider than the cam contacting slide portion 85 of the cam follower 84. With this arrangement wherein the projection 100 is wider than the cam slide portion 85 of the cam follower it can be appreciated that the parts may be assembled with wide manufacturing tolerances whereby at least some portion of the projection 100 is directly opposite the contacting portion 85 of the cam follower to hold the cam disc against the slide projection 100 without wobbling.

The projection 100 is positioned directly opposite to the cam contacting slide portion 85 of the spring urged cam follower 84 to allow the cam follower 84 to continuously urge the rotatable cam 50 into contact with the projection 100 on the control panel. In this manner, the cam follower 85 will always accurately sense the thickness of the portion of the rotatable cam 50 with which it is in contact. The thickness being the distance from the projection 100 on the control panel to the cam contacting slide portion 85 of the spring cam follower 84. It can be appreciated that with the loose fit between the cam shaft 54 and the circular aperture 55 in the control panel, when the spring urged cam follower 84 forces the cam surface 92 of the cam 50 forwardly such motion will not be impeded by any close fit of the cam shaft with respect to the circular aperture in the control panel. This is illustrated in the exaggerated position view of FIG. 9 wherein the cam follower 84/85 is urging the front surface 51 of the cam into contact with projection 100 tilts the warped cam slightly to move the shaft portion 54 at an angle to the aperture 55 in the control panel and to move the front surface 51 away from the lower projection 108 on the control panel.

Accordingly, with this unique construction it can be seen that the cam 50, cam follower 84 and control panel 7 can be manufactured at low cost and the reliability and accuracy of the control is enhanced. With the loose fit between the cam shaft and the aperture in the control panel, very wide manufacturing tolerances may be specified so that few if any parts that are manufactured will not meet the wide manufacturing specfications.

Moreover with this unique construction, even cams that are slightly warped or which have a front surface that is not completely flat may be just as effectively utilized as perfectly manufactured cams. This is achieved because with our improved construction the cam will always be held in close contact with the projection that is formed on the control panel. Accordingly a more accurate and exceedingly simple and reliable control is achieved while reducing the manufacturing costs of the appliance since manufacturing tolerances may be set that result in more parts that meet manufacturing quality control standards.

What we claim is:

1. In an electric oven toaster including heating elements and a thermostat switch which may be set to open when a particular preset temperature has been reached, the improvement comprising:
   a. a rotatable cam for setting a threshold temperature of the thermostat switch;
   b. said thermostat switch including a first movable temperature sensor, and a second movable member that is positioned by said rotatable cam so as to cause said thermostat switch to open at the threshold temperature that is set by said rotatable cam;
   c. a cam follower positioned between said rotatable cam and said second movable member;
   d. said cam follower including a slide portion urged into sliding contact with said manually rotatable cam;
   e. said rotatable cam having a shaft portion and a circular disc portion having a front surface and a cam surface that extends rearwardly and is in sliding engagement with the slide portion of said cam follower, said cam surface being shaped so that rotary position of said rotatable cam may be manually adjusted to move the cam follower to set the position of the second movable member of said thermostat switch to set the threshold temperature of said oven toaster;
   f. a support member having a circular aperture for loosely receiving and supporting the shaft portion of said rotatable cam;
   g. a fixed slide projection formed on said support member positioned for engagement with the front surface of said rotatable cam, said slide projection being positioned opposite to the slide portion of said cam follower so that said cam follower continuously urges the front surface of said rotatable cam into contact with said slide projection so that the cam follower accurately senses the thickness of the portion of the rotatable cam with which it is in contact.

2. An electric toaster oven as defined in claim 1 wherein the slide projection that is formed on said support member has a relatively small surface area for slidable engagement with a small portion of the front surface of said rotatable cam and wherein the surface area of the cam follower that contacts the rear surface of said rotatable cam is less than the surface area of said slide projection so that the parts may be assembled with wide tolerances whereby at least some portion of said projection is directly opposite the contacting portion of said cam follower to hold the cam against the slide projection without wobbling.

3. In an electric oven toaster including heating elements, a thermostat switch which may be set to open when a particular preset temperature has been reached, a main switch for energizing and deenergizing the oven toaster including its heating elements, and means operated upon opening of the thermostat switch to open the main switch to deenergize the heating elements when the particular temperature set by the thermostat is reached, the improvement comprising:
   a. a manually operable rotatable cam for setting a threshold temperature of the thermostat switch;
   b. said thermostat switch including a temperature sensor, a first movable switch blade with a contact mounted thereon, said first movable switch blade being positioned for movement by said temperature sensor, and a second movable switch blade with a contact mounted thereon;
   c. a cam follower spring blade positioned between said manually operable rotatable cam and said second movable switch blade;
   d. said cam follower spring blade including a slide portion urged into sliding contact with said manually rotatable cam;
   e. said rotatable cam having a shaft portion and a circular disc portion having a front surface and a cam surface that extends rearwardly and is in sliding engagement with the slide portion of said cam follower, said cam surface being shaped so that the rotary position of said rotatable cam may be manually adjusted to move the cam follower to set the position of the contact on the second movable switch blade to set the threshold temperature of said oven toaster;
   f. a control panel having a circular aperture for loosely receiving and supporting the shaft portion of said rotatable cam;
   g. a slide projection formed on said control panel positioned for engagement with the front surface of said rotatable cam, said slide projection being positioned directly opposite to the slide portion of said cam follower so that said cam follower continuously urges said rotatable cam into contact with said projection so that the cam follower accurately senses the thickness of the portion of the rotatable cam with which it is in contact.

4. In an electric oven toaster including upper heating elements, lower heating elements, a thermostat switch which may be set to open when a particular preset temperature has been reached, a main switch for energizing and deenergizing the oven toaster including both its upper and lower heating elements, and means operated upon opening of the thermostat switch to open the main switch to deenergize both the upper and lower heating elements when the particular temperature set by the thermostat is reached, the improvement comprising;
   a. a manually operable rotatable cam for setting a threshold temperature of the thermostat switch;
   b. said thermostat switch including a temperature sensor, a first movable switch blade with a contact mounted thereon, said first movable switch blade being positioned for movement by said temperature sensor, and a second movable switch blade with a contact mounted thereon;
   c. a cam follower blade positioned between said manually operable rotatable cam and said second movable switch blade;
   d. said cam follower blade including a generally flat mounting portion, a short blade portion, and a slide portion urged into sliding contact with said manually operable rotatable cam;
   e. said rotatable cam having a shaft portion and a circular disc portion having a front surface and a cam surface that extends rearwardly and is in sliding engagement with the slide portion of said cam follower, said cam surface being shaped so that the rotary position of said rotatable cam may be manually adjusted to move the cam follower to set the position of the movable member of said thermostat switch to set the threshold temperature of said oven toaster.

f. a support member having a circular aperture for loosely receiving and supporting the shaft portion of said rotatable cam;

g. a fixed slide projection formed on said support member positioned for engagement with the front surface of said rotatable cam, said slide projection being positioned opposite to the slide portion of said cam follower so that said cam follower continuously urges the front surface of said rotatable cam into contact with said slide projection so that the cam follower accurately senses the thickness of the portion of the rotatable cam with which it is in contact.

5. In an electric oven toaster including upper heating elements, lower heating elements, a thermostat switch which may be set to open when a particular preset temperature has been reached, a main switch for energizing and deenergizing the oven toaster including both its upper and lower heating elements, and means operated upon opening of the thermostat switch to open the main switch to deenergize both the upper and lower heating when the particular temperature set by the thermostat is reached, the improvement comprising:

a. a manually operable rotatable cam for setting a threshold temperature of the thermostat switch;

b. said thermostat switch including a temperature sensor, a first movable switch blade with a contact mounted thereon, said first movable switch blade being positioned for movement by said temperature sensor, and a second movable switch blade with a contact mounted thereon;

c. a cam follower blade positioned between said manually operable rotatable cam and said second movable switch blade;

d. said cam follower blade including a generally flat mounting portion, and a slide portion urged into sliding contact with said manually operable rotatable cam;

e. said rotatable cam having a shaft portion and a circular disc portion having a front surface and a cam surface that extends rearwardly and is in sliding engagement with the slide portion of said cam follower, said cam surface being shaped so that the rotary position of said rotatable cam may be manually adjusted to move the cam follower to set the position of the contact on the second movable switch blade to set the threshold temperature of said oven toaster.

f. a control panel having a circular aperture for loosely receiving and supporting the shaft portion of said rotatable cam;

g. three slide projections formed on said control panel positioned for engagement with the front surface of said rotatable cam for guiding said rotatable cam as it is manually rotated, one of said slide projections being positioned directly opposite to the slide portion of said cam follower so that said cam follower continuously urges said rotatable cam into contact with said projection whereby the cam follower accurately senses the thickness of the portion of the rotatable cam with which it is in contact.

* * * * *